UNITED STATES PATENT OFFICE.

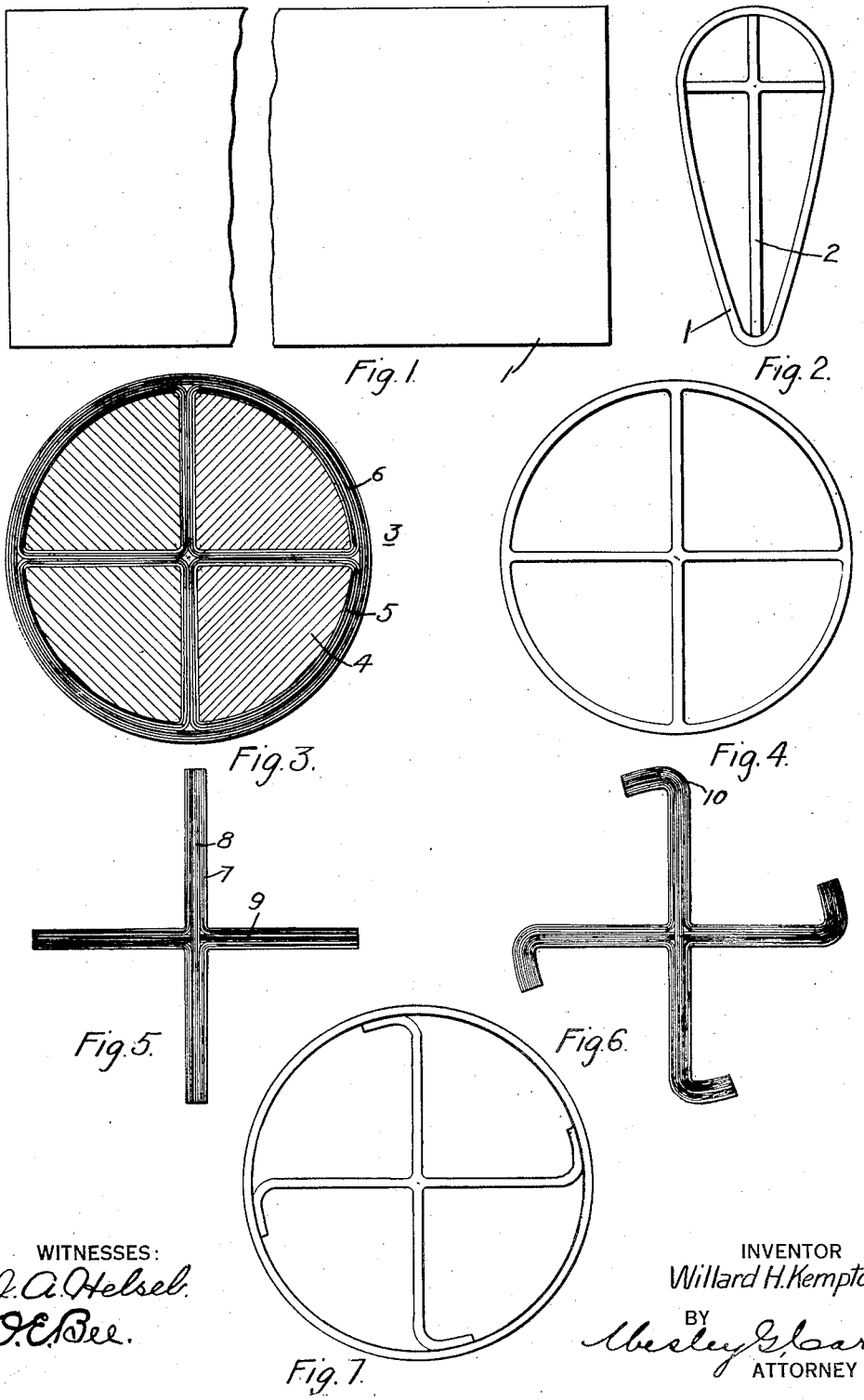

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

REINFORCED TUBE AND METHOD OF MAKING IT.

1,389,143. Specification of Letters Patent. Patented Aug. 30, 1921.

Application filed January 25, 1919. Serial No. 273,004.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Reinforced Tubes and Methods of Making Them, of which the following is a specification.

My invention relates to reinforced tubes of the type comprising superimposed layers of impregnated sheet material, and it has for its primary object the provision of such tubes which shall be light in weight and, at the same time, possess extraordinary mechanical strength relative to their weight and which, by virtue of these qualities, may be employed as various structural elements.

One object of my invention is to construct a tube by superimposing layers of sheet material impregnated with a suitable binder and to provide a reinforcing element therefor of similar material which may be disposed within the tube to reinforce it against bending or compressive strains.

Another object of my invention is to provide a reinforced tube which may be employed as a structural element regardless of the conditions under which it is employed, other than those concerning its mechanical strength, on account of being unaffected by oils, wide temperature changes, moisture, weak acids and alkalis.

Another object of my invention is to provide reinforced tubes which, in the ordinary course of their construction, attain a decorative finish which endures throughout the life of such tubes.

With these and other objects in view, my invention will be more fully described, illustrated in the drawings, in the several views of which corresponding numerals indicate like parts, and then particularly pointed out in the claims.

In the drawings, Figure 1 is a side elevation, parts being broken away, of a stream-line tube constructed in accordance with my invention; Fig. 2 is an end elevation of the tube shown in Fig. 1; Fig. 3 is a diagrammatic view of a modified form of tube which may be constructed in accordance with my invention, the tube being shown in an intermediate state of construction; Fig. 4 is an end elevation of the tube shown in Fig. 3 and shows the final form of the tube; Fig. 5 is an end view of a reinforcing element preformed in accordance with my invention; Fig. 6 is an end view of a modified form of reinforcing element which may be employed in constructing a tube in accordance with my invention, and Fig. 7 is an end elevation of a finished tube embodying a modification of my invention.

In constructing a tube in accordance with my invention, I may first construct a tube by winding suitable sheet material impregnated with a binder, such as a phenolic condensation product, about a mandrel and subjecting the wound body to heat and pressure in a mold to compact the material and to harden the binder. A reinforcing element may be provided for the tube by employing sheets of similar material impregnated with a binder similar to that employed in the tube. The sheet material may be cut and formed in strips of such character that, when they are stacked in a suitable manner, a cruciform reinforcing element will be provided. The material, stacked in this manner, may then be subjected to heat and pressure in a mold, after which the reinforcing element may be positioned within the tube.

Various tubes and reinforcing elements therefor may be constructed by modifying, slightly, the manner of assembling the tube and the reinforcing element. However, tubes constructed in accordance with any modification of my invention all possess qualities of mechanical strength heretofore unattainable with material possessing the same relative weight per unit mass. The tube and reinforcing element, being both constructed of the same material, the complete product is uniform and its qualities of resistance against strains may be accurately predetermined. Furthermore, such tubes attain a decorative finish which is highly advantageous when they are employed as structural elements in vehicles or articles in which the appearance of the finished product is of major importance.

In Fig. 1 is shown a stream-line tube 1 provided with a reinforcing element 2. The tube 1, in this instance, is formed separately from the reinforcing element 2. The tube is formed by superimposing windings of sheet material impregnated with a suitable binder. The sheet material employed may be paper, duck or muslin and the binder is preferably a phenolic condensation product. The treated material may be wound about a mandrel, having the contour of the article desired, until a suitable thickness has been reached, and the mandrel, with the inclosing material, may be disposed in a mold and subjected to heat and pressure. The reinforcing element 2 may be constructed by impregnating sheet material, similar to that utilized in the tube, with a phenolic condensation product after which it may be dried to facilitate its handling. The sheet material may be cut and formed in L-shaped strips which may be stacked to form the reinforcing element 2. The stacked sheets are then placed in a suitable mold and subjected to heat and pressure which compacts them and, by hardening the binder, unites them into a solid, unitary body. The reinforcing element 2, formed in this manner, may then be disposed within the tube 1, as shown in Fig. 2, and, when so disposed, increases the resistance of the tube against bending and compressive strains. A tube of this particular shape is adapted for employment as a structural element in vehicles in which it is desired to reduce the air resistance.

In Fig. 3 is shown a modified form of tube 3 which may be constructed in accordance with my invention. In this instance, mandrels 4 each of which, in cross section, is substantially a quadrant, may be employed, and impregnated sheet material 5 may be wound about each of the mandrels 4 until a suitable thickness has been reached. The material 5 may be impregnated with a binder, in an inactive state, which will become active upon further application of heat. The mandrels 4, with the surrounding material, may be placed to engage each other in such manner that a substantially cylindrical body is provided, about which are wound layers of material 6, which is the same as material 5. The body thus formed may then be disposed in a suitable mold and subjected to heat and pressure which compresses the material and hardens the binder so that a solid, unitary body results. The body may then be removed from the mold and the mandrels 4 removed from the tube, the completed reinforced tube appearing, substantially, as shown in Fig. 4.

In Fig. 5 is shown the manner of assembling a reinforcing element which may be constructed separate from the tube which it is to reinforce. L-shaped strips 7 of a treated sheet material are stacked with their respective extending arms engaging, this manner of assembly insuring slightly better union of the several parts when the material is subjected to heat and pressure. However, the L-shaped pieces may have straight portions 8 and 9 interposed between them to increase the thickness of the extending arms.

In Fig. 6 is shown a similar reinforcing element to that shown in Fig. 5, the only variation in structure residing in the laterally bent and curved edge portions 10. A reinforcing element, constructed in this manner, allows for slight variations in the diameter of the separately formed tube, for the reason that the portions of the reinforcing elements which engage the tube, being slightly resilient, may be forced within a tube of smaller diameter than the reinforcing element was originally designed for. The curved end portions of such reinforcing elements also provide greater engaging surfaces with the interior of the tube.

In Fig. 7, a tube, employing a reinforcing element constructed as indicated in Fig. 6, is shown. The reinforcing element and tube are shown after having been subjected to heat and pressure and are, therefore, in their ultimate form for use.

A tube constructed in accordance with my invention may be employed as a structural element in airplanes or it may be employed as a part of the equipment, such as the antenna pole, of a field wireless system. It is obvious that various uses may be found for a tube of the character described on account of its compact structure, light weight and great mechanical strength.

Although I have described, specifically, seevral modified forms of tubes which may be constructed in accordance with my invention, it is obvious that tubes of other forms may be constructed by varying the mode of assembly of the tube and reinforcing element and I desire, therefore, that no limitations shall be imposed except such as are indicated in the appended claims.

I claim as my invention:

1. A composite tube comprising superimposed layers of sheet material impregnated with a hardened binder and a reinforcing member of similar material.

2. A composite tube comprising superimposed layers of sheet material impregnated with a hardened phenolic condensation product and a reinforcing member of similar material.

3. A molded tube comprising superimposed layers of sheet material impregnated with a hardened binder and a reinforcing member including superimposed layers of sheet material impregnated with a hardened binder.

4. A composite tube comprising superimposed layers of sheet material impregnated with a hardened binder and a reinforcing member of similar material molded therewith.

5. A composite tube comprising superimposed layers of sheet material impregnated with a hardened phenolic condensation product and a reinforcing member of similar material molded therewith.

6. A composite tube comprising superposed layers of sheet material impregnated with a hardened phenolic condensation product and a reinforcing element of similar material inclosed by the tube and extending along its entire length, said element being substantially cruciform in cross-section.

7. A composite tube comprising a plurality of tubes of superimposed layers of sheet material impregnated with a hardened binder assembled to form a cellular structure and an exterior tube formed of superposed layers of sheet material impregnated with a hardened binder.

8. A composite tube comprising superposed layers of sheet material impregnated with a hardened binder and a reinforcing element formed of layers of sheet material impregnated with a hardened binder, said element being substantially cruciform in cross-section and having curved edge portions adapted to engage the tube.

9. A method of making reinforced tubes that comprises superimposing layers of sheet material, impregnated with a phenolic condensation product, about mandrels each of which is substantially a quadrant in cross-section, placing four mandrels with the inclosing windings in engagement with each other to form an elongate rod, winding sheet material impregnated with a phenolic condensation product about the body thus assembled, disposing the body in a mold, subjecting it to heat and pressure and removing the mandrels from the pressed body.

10. A method of making reinforced tubes that comprises superposing layers of sheet material, impregnated with a phenolic condensation product, about a plurality of mandrels, disposing the inclosed mandrels to engage each other, winding sheet material impregnated with a phenolic condensation product about the assembled mandrels, disposing the resulting body in a mold and subjecting it to heat and pressure.

In testimony whereof, I have hereunto subscribed my name this 29th day of Nov. 1918.

WILLARD H. KEMPTON.